(12) United States Patent
Fujisawa et al.

(10) Patent No.: US 7,994,907 B2
(45) Date of Patent: Aug. 9, 2011

(54) IMAGE INFORMATION GENERATION DEVICE, DISPLAY CONTROL DEVICE USING THE SAME, INFORMATION DISPLAY SYSTEM FOR TRAVEL BODY, MODULE FOR DRIVER SEAT, AND TRAVEL BODY

(75) Inventors: Masayuki Fujisawa, Nara (JP); Fumiaki Fujimoto, Nara (JP); Teruhisa Masui, Nara (JP); Masaki Kobayashi, Yamatokooriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 530 days.

(21) Appl. No.: 12/295,019

(22) PCT Filed: Mar. 28, 2007

(86) PCT No.: PCT/JP2007/056643
§ 371 (c)(1),
(2), (4) Date: Sep. 29, 2008

(87) PCT Pub. No.: WO2007/114166
PCT Pub. Date: Oct. 11, 2007

(65) Prior Publication Data
US 2010/0245071 A1  Sep. 30, 2010

(30) Foreign Application Priority Data

Mar. 31, 2006 (JP) .................................. 2006-099356

(51) Int. Cl.
*B60Q 1/00* (2006.01)
(52) U.S. Cl. ...................... 340/461; 340/438; 340/425.5
(58) Field of Classification Search .................. 340/461, 340/438, 439, 425.5, 441, 459; 348/148; 701/1, 301
See application file for complete search history.

(56) References Cited

U.S. PATENT DOCUMENTS

| 5,764,139 A * | 6/1998 | Nojima et al. ................. 340/461 |
| 6,788,196 B2 * | 9/2004 | Ueda .............................. 340/459 |
| 7,609,152 B2 * | 10/2009 | Crowe et al. ................... 340/461 |
| 7,821,387 B2 * | 10/2010 | Okumura et al. ............. 340/461 |

FOREIGN PATENT DOCUMENTS

JP 11-311545 A 11/1999

OTHER PUBLICATIONS

Official Communication issued in International Patent Application No. PCT/JP2007/056643, mailed on May 15, 2007.

* cited by examiner

*Primary Examiner* — Toan N Pham
(74) *Attorney, Agent, or Firm* — Keating & Bennett, LLP

(57) ABSTRACT

In an image information generation device, based on status information representing statuses of various sections of a mobile unit such as a motor vehicle, image information used to display an image required, for instance, for steering this mobile unit on a display device is generated easily. In order to generate, as the image information, a layout identifier that specifies a layout of an image to be displayed on the liquid crystal display device and a component image identifier that specifies a display mode of each component image in the layout, the DPF controller compares the MEN/SEN judging table that stores an identifier table in which a correlation between the status information and the MEN, a correlation between the status information and the SEN, and a correlation between the MEN and the SEN are defined with the status information collected from the ECUs in the various sections of the mobile unit.

10 Claims, 10 Drawing Sheets

| CAN variable number | CAN_ID (2 bytes) | Position (2 bytes) | Length (2 bytes) | Bit (2 bytes) | Minimum value (4 bytes) | Maximum value (4 bytes) | Default value (4 bytes) |
|---|---|---|---|---|---|---|---|
| #1 | 100 | 0 | 2 | -1 | 0 | 180 | 0 |
| #2 | 100 | 2 | 2 | -1 | 0 | 20000 | 0 |
| #3 | 100 | 4 | 4 | -1 | 0 | 9999999 | 0 |
| #4 | 101 | 0 | 4 | -1 | 0 | 99999 | 0 |
| ⋮ | | | | | | | |
| #72 | 106 | 6 | 1 | 0 | 0 | 1 | 0 |
| #73 | 106 | 6 | 1 | 1 | 0 | 1 | 0 |

| MEN: Name of layout | MEN of transition target layout | Transition condition ||||
|---|---|---|---|---|---|
| | | Logical expression | Comparison expression | Variable | Value |
| 0: Start of transition | 1 | | EQ | Ignition | "OFF" |
| | 2 | | EQ | Ignition | "ACC" |
| | 3 | AND | EQ | Corner sensor (ALL) | "ON" |
| | | | NE | Select position | "P" |
| | 4 | | EQ | Shift position | "R" |
| | 11 | | EQ | Left direction indicator | "ON" |
| | 12 | | EQ | Right direction indicator | "ON" |
| 1: OFF screen | 2 | | NE | Ignition | "OFF" |
| 2: Accessory | 5 | | NE | Ignition | "ACC" |
| 3: Corner sensor | 6 | OR | EQ | Corner sensor (ALL) | "OFF" |
| | | | EQ | Select position | "P" |
| 4: Reverse travel | 6 | | NE | Shift position | "R" |
| 5: Warning screen | 6 | | NE | Shift position | "N" |
| 6: Low-speed travel | 7 | | GE | Speed | 30 |
| 7: Normal travel | 6 | | LE | Speed | 25 |
| | 8 | | GE | Speed | 100 |
| 8: High-speed travel | 7 | | LE | Speed | 95 |
| 9: Low-speed left turn and travel | 6 | | EQ | Left direction indicator | "OFF" |
| | 11 | | GE | Speed | 30 |
| 10: Low-speed right turn and travel | 7 | | EQ | Right direction indicator | "OFF" |
| | 12 | | GE | Speed | 30 |
| 11: Left turn and travel | 7 | | EQ | Left direction indicator | "OFF" |
| | 9 | | LE | Speed | 25 |
| 12: Right turn and travel | 7 | | EQ | Right direction indicator | "OFF" |
| | 10 | | LE | Speed | 25 |

FIG. 9

| 2 bytes | 4 bytes | 2 bytes | 2 bytes | 2 bytes | 2 bytes |
|---|---|---|---|---|---|
| CAN variable number | Comparative value | Time(1) | SEN number (1) | Time(2) | SEN number (2) |
| #3 | 1 | 500 | 101 | 500 | 102 |
| #3 | 0 | 0 | 100 | 0 | 0 |
| #2 | 0 | 0 | 200 | 0 | 0 |
| #2 | 1 | 0 | 201 | 0 | 0 |
| #2 | 2 | 0 | 202 | 0 | 0 |
| #2 | 3 | 0 | 203 | 0 | 0 |
| #2 | 4 | 0 | 204 | 0 | 0 |
| #2 | 5 | 0 | 205 | 0 | 0 |

IMAGE INFORMATION GENERATION DEVICE, DISPLAY CONTROL DEVICE USING THE SAME, INFORMATION DISPLAY SYSTEM FOR TRAVEL BODY, MODULE FOR DRIVER SEAT, AND TRAVEL BODY

BACKGROUND OF THE INVENTION

1. Field of the Invention

The present invention relates to a technique of using a dot-matrix type display device to present a driver with an image required, for instance, for steering a mobile unit such as a motor vehicle. More specifically, this invention relates to an image information generation device for generating image information used to display the above-described image on the display device, a display control apparatus including the same, an information display system for a mobile unit, a cockpit module, and a mobile unit.

2. Description of the Related Art

Conventionally, meters of the analog or counting type, as well as indicator lamps using, for instance, light bulbs or LEDs, have been often used on the dashboards of motor vehicles, etc. Furthermore, segmented liquid crystal displays have also been in general use for numeric digital displays and indicator displays.

However, in recent years, dot-matrix type image display devices such as liquid crystal panel display devices have also come to be used for the dashboards of motor vehicles, etc. Specifically, at least a portion of a dashboard is formed as a dot-matrix type image display device capable of displaying arbitrary patterns, with images of, for instance, meters such as a speedometer and various types of indicators displayed thereon.

The above-described use of dot-matrix type image display devices on the dashboards of motor vehicles, etc., allows dashboard displays to have various patterns. For instance, the types of displayed meters and indicators, as well as their arrangement and dimensions, can be dynamically changed as required. Moreover, images other than the dashboard image such as, for instance, images of scenery outside the vehicle captured by, for instance, a CCD (charge coupled device) imaging device or images used for navigation can be synthesized and displayed together with images of meters.

For instance, JP 11(1999)-311545 A discloses a display control apparatus that performs a display in which display information to be displayed and a display layout are selected from among a plurality of pieces of display information preset so as to correspond to the traveling status of a vehicle. In this display control apparatus disclosed in JP 11(1999)-311545 A, display information and timing for displaying the display information can be added or changed at the request of a user. Furthermore, it is also possible to identify a plurality of users individually and switch a display mode depending on the respective users.

Motor vehicles of recent years have a configuration in which a large number of ECUs (electronic control units) are provided in various sections of a motor vehicle and are connected via an in-vehicle LAN. In this configuration, each of the ECUs is capable of performing various types of information processing and control based on status information obtained from the other ECUs. For instance, status information related to, for instance, an engine RPM, a traveling speed, a gear position, etc., is transmitted from a processor of an ECU that governs a drive system including an engine and a power transmission mechanism to an image-displaying ECU that controls the display of a dashboard. Furthermore, information related to, for instance, the illumination status of lights, the opened/closed status of doors, the presence or absence of air bag malfunctions, the fastened/unfastened status of seatbelts, etc. is transmitted from a processor of an ECU that governs a safety system contributing to the safety of the motor vehicle. Moreover, information related to an air conditioner air outlet temperature, a cabin temperature, etc. is transmitted from a processor of an ECU that governs an amenity system contributing to the comfort inside the vehicle to the image-displaying ECU.

In an information display system for a mobile unit according to the conventional technique, based on each of the plural types of information transmitted from the plurality of ECUs, the image-displaying ECU generates images in predetermined modes that make it easier for a driver to intuitively recognize the statuses of the above-described systems. For instance, an image representing a conventional analog type speedometer, or an image displaying the speed as a numeric value is generated so as to represent the traveling speed. Furthermore, for instance, if any of the doors is not snugly closed, an image showing that the door is open is generated. In addition, images are generated that represent various indicators such as, for instance, a gear position indicator, a fuel level gauge, a radiator coolant temperature gauge, etc. The images thus generated respectively based on the various types of information are then superimposed to generate a single image representing the entire motor vehicle dashboard, which is displayed on a display device.

However, in the conventional technique, there has not yet been established a mechanism of a motor vehicle for efficiently generating display information based on information sent from the ECUs in the various sections to the image-displaying ECU. In general, the format of information sent out from the ECUs in the various sections varies depending on the manufacturer or type of a motor vehicle. Because of this, conventionally, a processing program for generating display information based on information sent to the image-displaying ECU needs to be created for every manufacturer or type of a motor vehicle, thus requiring much time and effort to be spent on program development.

SUMMARY OF THE INVENTION

In order to overcome the problems described above, preferred embodiments of the present invention provide an image information generation device that is capable of easily generating, based on status information representing statuses of various sections of a mobile unit such as a motor vehicle, image information used to display an image required, for instance, for steering this mobile unit on a display device, a display control apparatus including the same, an information display system for a mobile unit, a cockpit module, and a mobile unit.

An image information generation device according to a preferred embodiment of the present invention is an image information generation device that generates, based on status information collected from various sections of a mobile unit, image information used to display an image corresponding to a status of the mobile unit on a dot-matrix type display device. The image information includes a layout identifier that specifies a layout of an image to be displayed on the display device and a component image identifier that specifies a display mode of each component image in the layout. The image information generation device includes: an identifier storing portion that stores an identifier table in which a correlation between the status information and the layout identifier, a correlation between the status information and the component image identifier, and a correlation between the layout identifier and the component image identifier are defined; and an identifier determining portion that acquires status information collected from the various sections of the mobile unit, compares the acquired status information with the identifier table, determines, based on the comparison, one of the layout identifiers and a group of component image identifiers among the component image identifiers that correspond to a status of the mobile unit at a time when the status information was collected, and outputs the one of the layout identifiers and the group of component image identifiers.

According to the above-described configuration, the identifier determining portion acquires status information collected from various sections of a mobile unit, compares the acquired status information with the identifier table, determines, based on the comparison, one of the layout identifiers and a group of component image identifiers among the component image identifiers that correspond to a status of the mobile unit at a time when the status information was collected, and outputs them. In the identifier table, a correlation between the status information and the layout identifier, a correlation between the status information and the component image identifier, and a correlation between the layout identifier and the component image identifier are defined. Accordingly, even in the case where the format of status information collected from various sections of a mobile unit varies depending on the type of the mobile unit, it is only required that the contents of the identifier table be changed so as to correspond to the type of the mobile unit, and it is not required that processing performed by the identifier determining portion be changed so as to correspond to the type of the mobile unit. Thus, based on status information representing statuses of various sections of a mobile unit such as a motor vehicle, image information used to display an image required, for instance, for steering this mobile unit on a display device can be generated easily.

Preferably, in the image information generation device according to a preferred embodiment of the present invention, the identifier table defines, as the correlation between the status information and the layout identifier, a transition relationship between a plurality of layouts and a transition condition that needs to be satisfied by the status information in order for a transition between the plurality of layouts to occur, and every time the identifier determining portion acquires status information collected from the various sections of the mobile unit, the identifier determining portion compares the acquired status information with the transition condition in the identifier table, determines, based on the comparison, one of the layout identifiers corresponding to a layout as a transition target layout, and outputs the one of the layout identifiers.

Moreover, preferably, in the image information generation device according to a preferred embodiment of the present invention, in the identifier table, the transition condition is defined using a comparison expression for comparing a variable included in the status information with a predetermined value, and the identifier table includes a variable conversion table for extracting the variable from the status information.

Preferably, in the image information generation device according to a preferred embodiment of the present invention, the identifier table defines, as the correlation between the layout identifier and the component image identifier, a display mode of a component image that can be included in each layout, and every time the identifier determining portion acquires status information collected from the various sections of the mobile unit, the identifier determining portion compares the acquired status information with the identifier table, and determines, based on the comparison, one of the layout identifiers and a group of component image identifiers among the component image identifiers. In this case, in the determination, at least one of the group of component image identifiers that is correlated with the determined one of the layout identifiers according to the correlation between the layout identifier and the component image identifier is determined to be outputted.

Furthermore, in order to achieve the above-described advantages, a display control apparatus according to a preferred embodiment of the present invention includes: the image information generation device according to another preferred embodiment of the present invention having any one of the above-described configurations; an image storing portion that stores layout images corresponding respectively to the layout identifiers and component images corresponding respectively to the component image identifiers; and an image synthesizing portion that acquires one of the layout identifiers and at least one of the component image identifiers that are outputted from the identifier determining portion of the image information generation device, extracts one of the layout images corresponding to the one of the layout identifiers and at least one of the component images corresponding to the at least one of the component image identifiers from the image storing portion, and synthesizes the one of the layout images and the at least one of the component images to generate an image to be displayed on the display device.

Furthermore, in order to achieve the above-described advantages, an information display system for a mobile unit according to a preferred embodiment of the present invention includes: the display control apparatus according to another preferred embodiment of the present invention; and a display device that displays an image generated by the image synthesizing portion of the display control apparatus. Moreover, it is preferable that the display device is a liquid crystal display device.

Furthermore, in order to achieve the above-described advantages, a cockpit module according to a preferred embodiment of the present invention is a cockpit module that is installed in a vicinity of a cockpit of a mobile unit, and includes the information display system for a mobile unit according to another preferred embodiment of the present invention having any one of the above-described configurations.

Moreover, in order to achieve the above-described advantages, a mobile unit according to a preferred embodiment of the present invention includes the information display system for a mobile unit according to another preferred embodiment of the present invention having any one of the above-described configurations, and in the mobile unit, the display device is installed at a position viewable at least from a cockpit. Furthermore, preferably, in the case where this mobile unit is a motor vehicle, the status information is transmitted from ECUs provided in various sections of the motor vehicle and is collected into the image information generation device via an in-vehicle network.

According to various preferred embodiments of the present invention, there can be provided an image information generation device that is capable of easily generating, based on status information representing statuses of various sections of a mobile unit such as a motor vehicle, image information used to display an image required, for instance, for steering this mobile unit on a display device, a display control apparatus including the same, an information display system for a mobile unit, a cockpit module, and a mobile unit.

Other features, elements, steps, characteristics and advantages of the present invention will become more apparent from the following detailed description of preferred embodiments of the present invention with reference to the attached drawings.

Figure 3A:
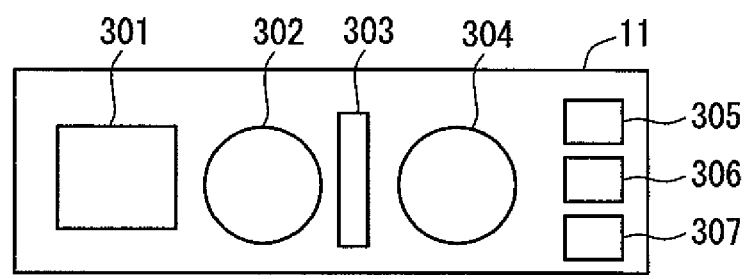
Figure 3B:
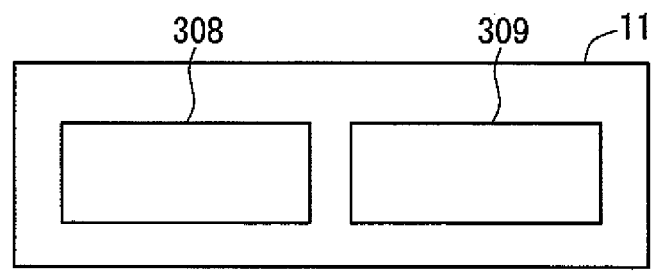

Each of FIGS. 3A and 3B is a plan view showing one example of a layout specified by a MEN.

Figure 4A:
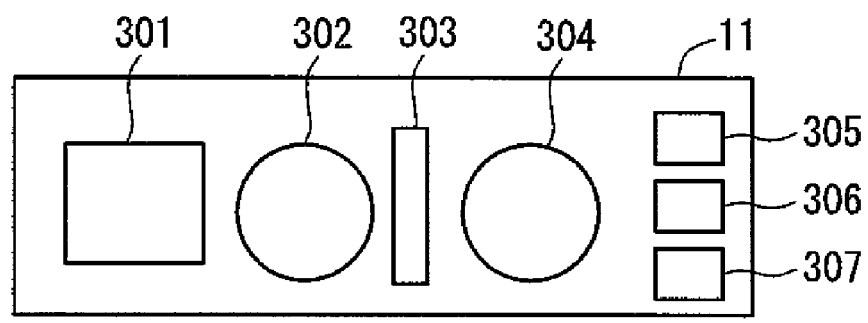
Figure 4B:
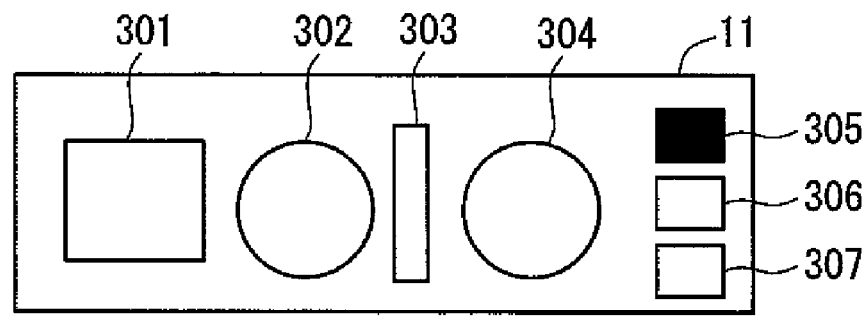

Each of FIGS. 4A and 4B is a plan view showing one example of a display mode of a component image specified by a SEN.

Figure 5:
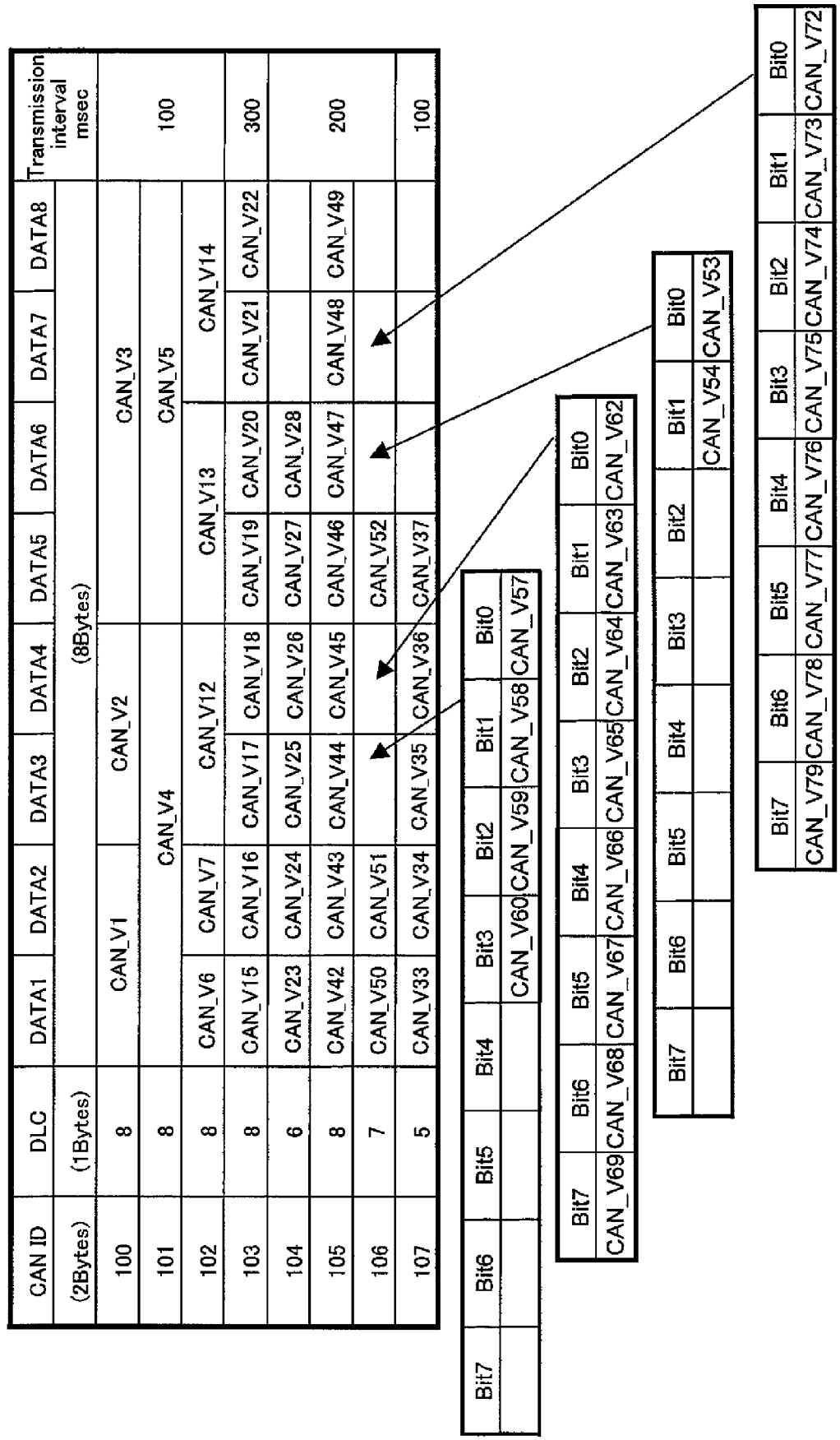

FIG. 5 is an explanatory diagram showing an example of a format used in the case where status information D is transmitted on an in-vehicle LAN 70 in accordance with CAN.

Figure 6:
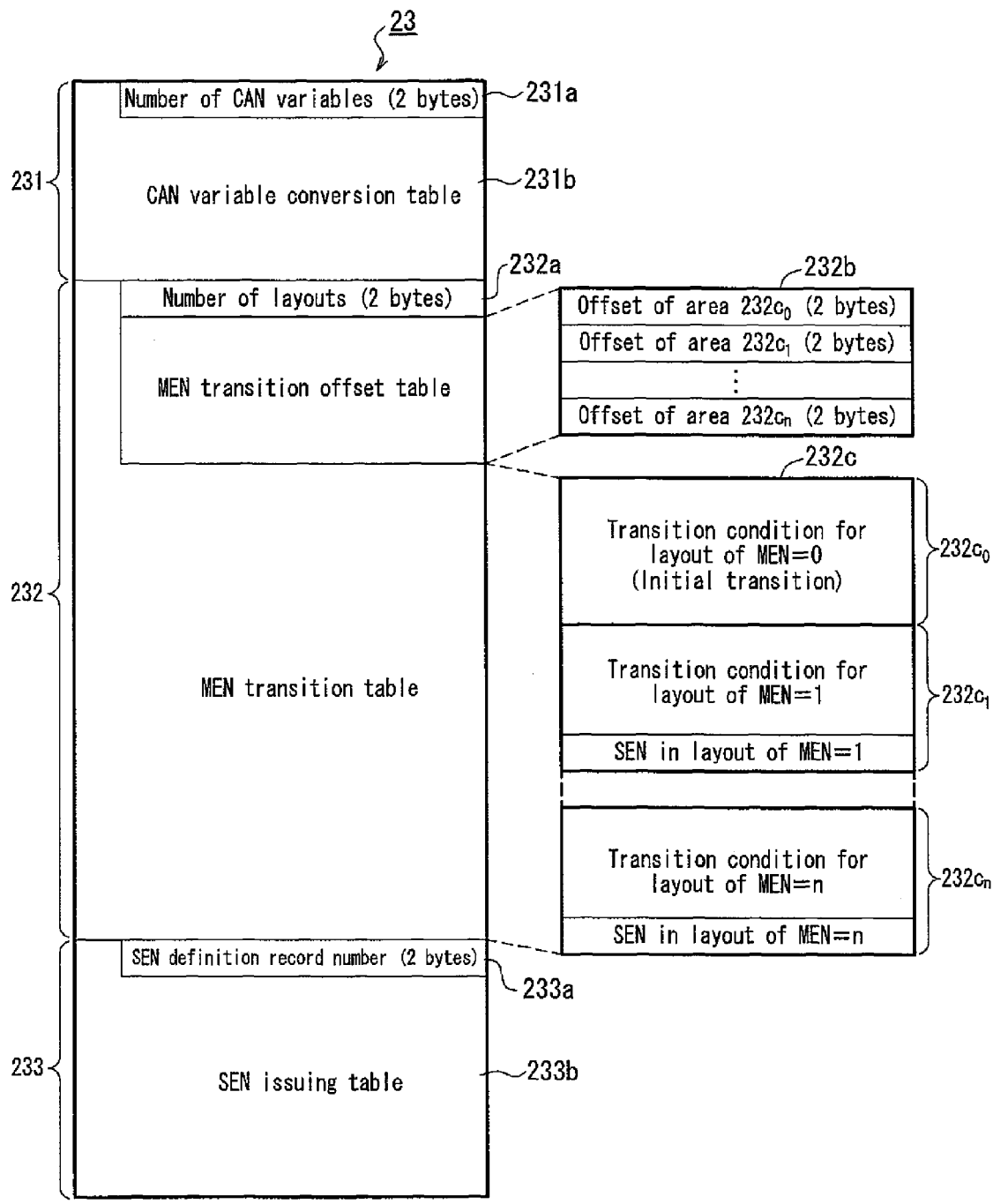

FIG. 6 is an explanatory diagram showing one example of a logical structure of a MEN/SEN judging table that is used to determine a MEN and SENs based on CAN data.

FIG. 7 is an explanatory diagram showing an example of data contained in an area 231*b*.

Figure 8:
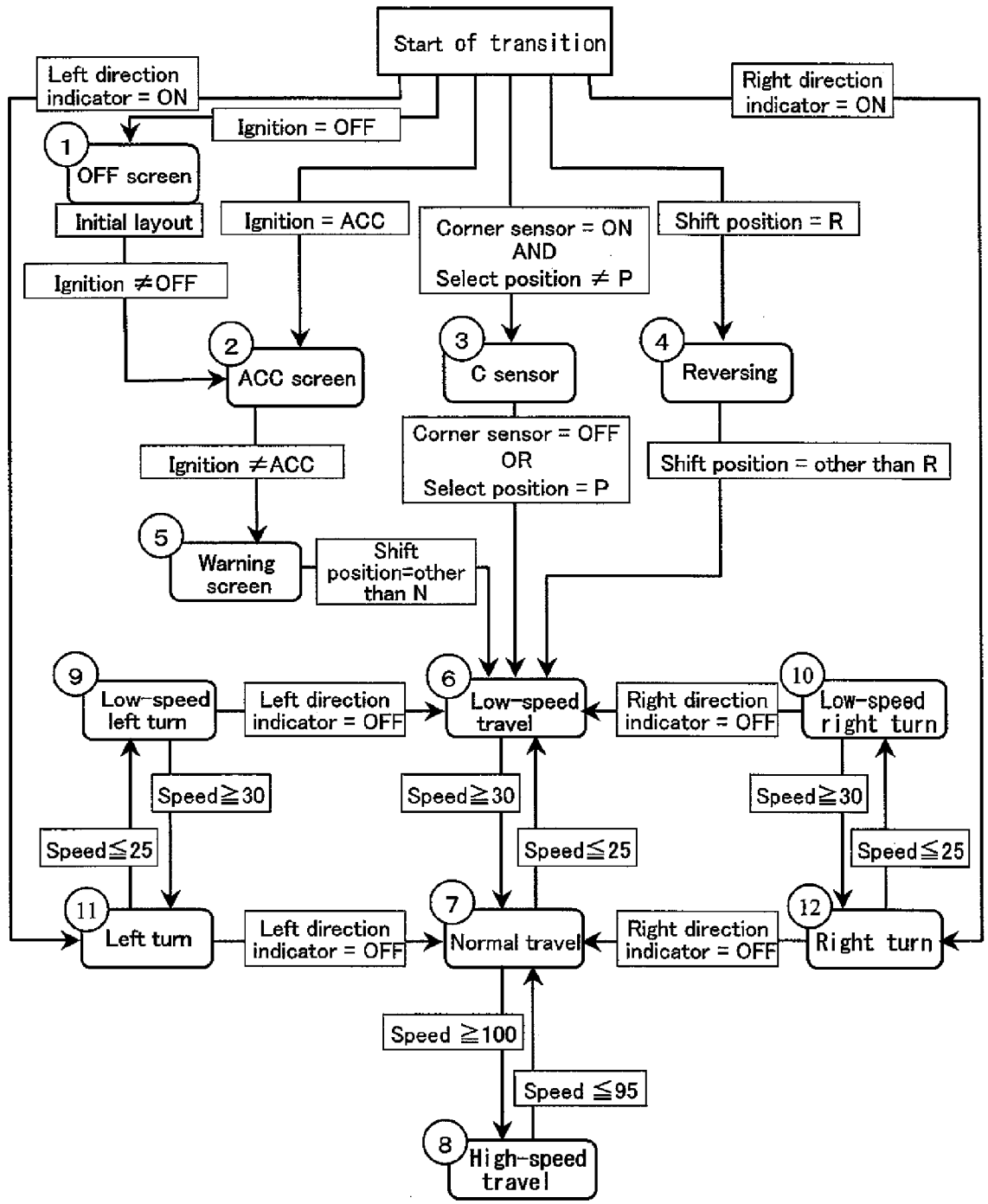

FIG. 8 is a status transition diagram that shows transitions between a plurality of layouts and is used for a display on a liquid crystal display device 11 in an information display system for a motor vehicle according to a preferred embodiment of the present invention.

FIG. 9 is an explanatory diagram showing an example of definitions in an area 232*c* of a MEN transition table for realizing the status transitions shown in FIG. 8.

Figure 10:
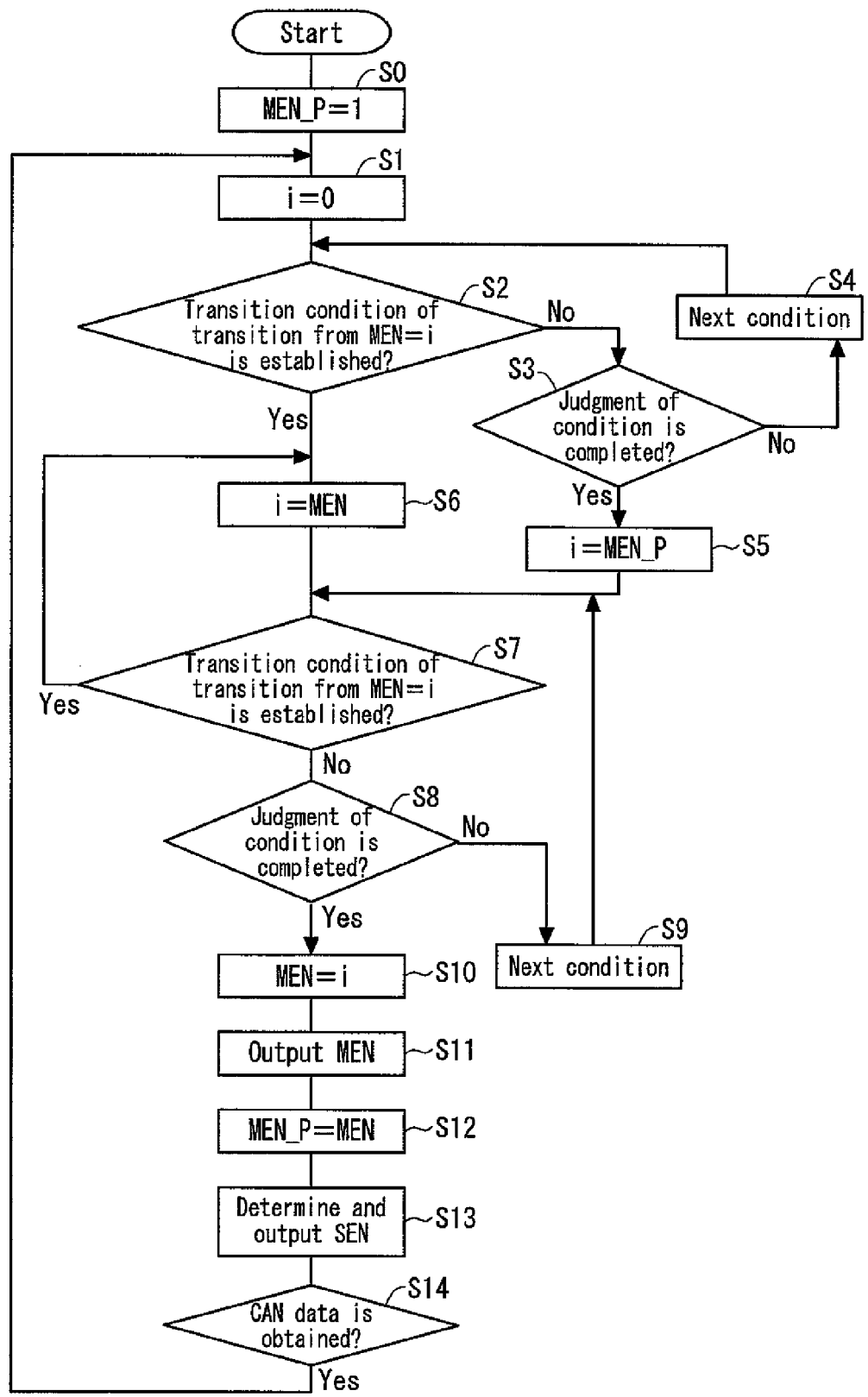

FIG. 10 is a flowchart showing a procedure of processing in which upon acquiring CAN data, a DPF controller determines a MEN and a SEN(s).

Figures 11, 12:
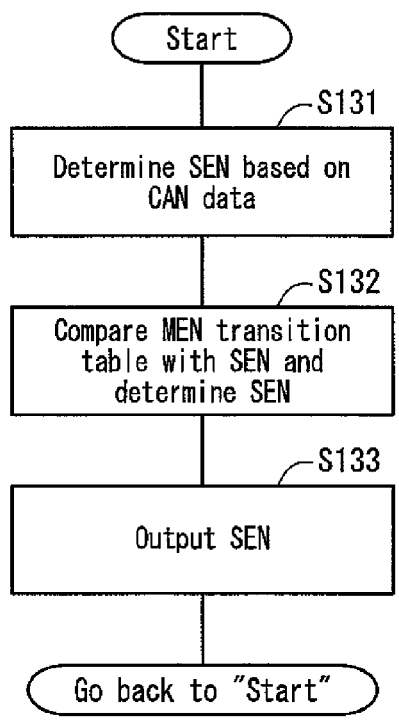

FIG. 11 is an explanatory diagram showing one example of a structure of a SEN issuing table.

FIG. 12 is a flowchart showing internal processing performed in Step S13 in the flowchart shown in FIG. 10.

DETAILED DESCRIPTION OF THE PREFERRED EMBODIMENTS

One preferred embodiment of the present invention as applied to a motor vehicle (passenger vehicle) is described specifically below with reference to drawings. It is to be noted, however, that the scope of the present invention is not limited only to motor vehicles. In addition to motor vehicles, the present invention can be applied to various transportation apparatuses (moving apparatuses or conveying apparatuses) such as motor bicycles, motor tricycles, special-purpose vehicles, railroad cars and other road vehicles, amphibious vehicles, aircraft or watercraft. Moreover, the present invention is not limited to the above-described transportation equipment intended primarily for moving or conveying, and is also applicable to other steerable equipment with which steering of the various types of conveying apparatuses described above can be simulated. In the present application, the above-described conveying apparatuses, transportation equipment, and steerable equipment, etc. are collectively referred to as "mobile units".

Figure 2:
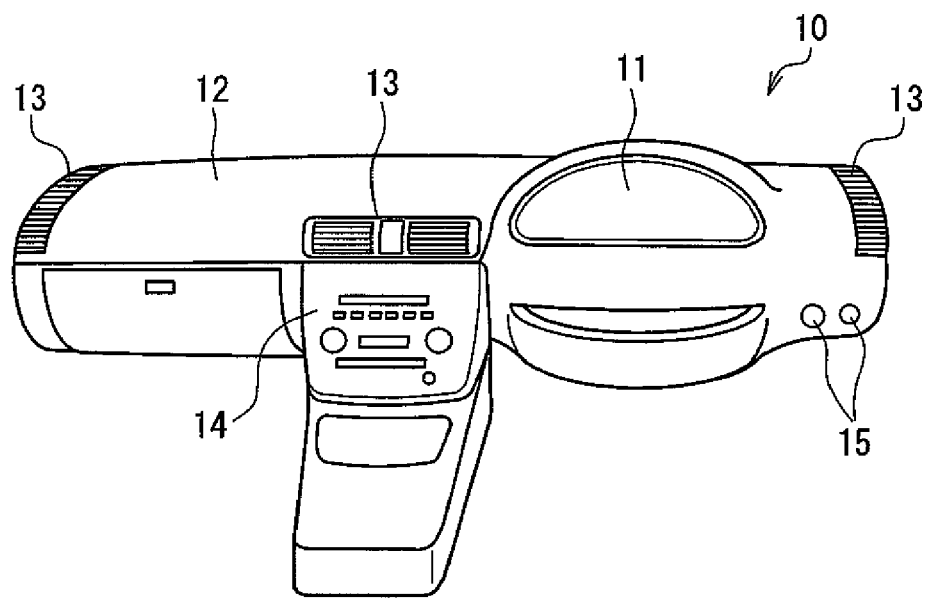
FIG. 2 is a front view showing the outer appearance of a cockpit module for a motor vehicle (cockpit module) in which an information display system for a vehicle, etc., according to a preferred embodiment of the present invention is incorporated.

FIG. 2 is a front view showing the outer appearance of a cockpit module for a motor vehicle (cockpit module) in which an information display system for a vehicle, etc. according to the present preferred embodiment is incorporated. As shown in FIG. 2, instead of a conventional motor vehicle dashboard including, for instance, conventional analog meters such as a speedometer and a tachometer as well as indicator lamps formed of LEDs, etc., a cockpit module 10 for a motor vehicle according to the present preferred embodiment includes a liquid crystal display device 11 that displays a composite image of a motor vehicle dashboard.

The liquid crystal display device 11 is not a segmented liquid crystal display often used in conventional motor vehicles but preferably is a dot-matrix type liquid crystal panel-based display device. Having the ability to display images of arbitrary patterns, the liquid crystal display device 11 can function as an information display device for a motor vehicle by displaying a composite image produced by combining various types of component images such as images of various types of meters and indicator lamps, etc. Furthermore, in addition to the dashboard image, for instance, images captured by onboard cameras installed on the back or on both sides of a motor vehicle, navigation images, or images received through the television broadcasting service, images reproduced by an onboard DVD player, etc., can also be displayed on the liquid crystal display device 11.

The liquid crystal display device 11 is attached to an instrument panel 12 constituting a frame of the cockpit module 10 in such a manner as to be positioned behind a steering wheel (not shown). In addition to the liquid crystal display device 11, the cockpit module 10 includes an air-conditioning unit (not shown), an air-conditioning duct 13 that guides air from the air-conditioning unit into the interior of the vehicle, an audio module 14, lamp switches 15, a steering mechanism (not shown), an air bag module (not shown), etc.

The configuration of the cockpit module shown in FIG. 2 is merely one example and the preferred embodiments of the present invention are not limited thereto. For instance, although in the example of FIG. 2, the liquid crystal display device 11 is arranged directly opposite the driver, the present invention is not limited to such an arrangement and may use a structure in which the liquid crystal display device 11 is arranged in the central portion of the instrument panel, i.e. between the driver's seat and the passenger's seat.

Figure 1:
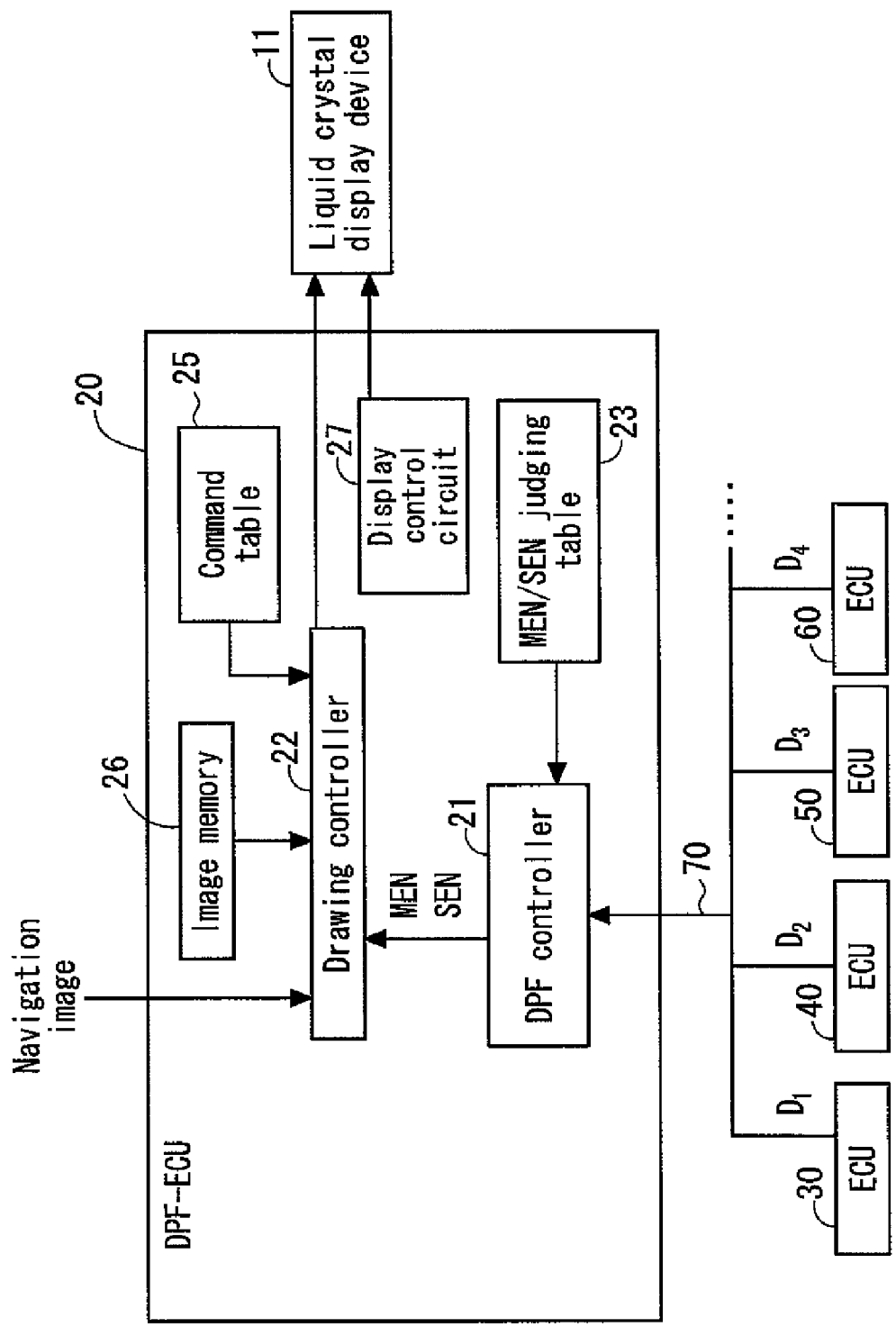
FIG. 1 is a block diagram showing a functional configuration of an information display system for a vehicle, etc., according to a preferred embodiment of the present invention.

FIG. 1 is a block diagram showing one example of a functional configuration of the information display system for a motor vehicle according to the present preferred embodiment. The display on the liquid crystal display device 11 is controlled by a DPF (display platform) ECU 20 that is shown in FIG. 1. The DPF-ECU 20 is one of a large number of ECUs mounted in the motor vehicle. The DPF-ECU 20 includes a DPF controller 21 (identifier determining portion), a drawing controller 22 (image synthesizing portion), a MEN/SEN judging table 23 (identifier storing portion), a command table 25, an image memory 26 (image storing portion), and a display control circuit 27. Herein, the DPF controller 21 and the MEN/SEN judging table 23 represent one preferred embodiment of the image information generation device according to the present invention, and the DPF-ECU 20 represents one preferred embodiment of the display control apparatus according to the present invention.

Although in FIG. 1, the internal configuration of the DPF-ECU 20 is shown in the form of functional blocks, various modes of mounting these blocks on hardware are possible. For instance, all the functional blocks shown in FIG. 1 may be mounted on a single circuit board, or alternatively, for instance, the functional blocks shown in FIG. 1 can also be mounted on a plurality of semiconductor integrated circuits in a distributed manner. In the latter case, for instance, it is also possible to mount the DPF controller 21 and the MEN/SEN judging table 23 on a semiconductor integrated circuit independently of the other functional blocks.

The DPF-ECU 20 is connected to various ECUs 30, 40, 50, 60 . . . that are provided in various sections of the motor vehicle via an in-vehicle LAN 70. Via the in-vehicle LAN 70, the DPF-ECU 20 acquires pieces of information (status information) $D_1$ to $D_4$ . . . (hereinafter, generically referred to as status information D unless otherwise required) that represent the statuses of the various sections of the motor vehicle from the ECUs 30, 40, 50, 60 . . . at a predetermined cycle. The "predetermined cycle" is set to an arbitrary length of time according to, for instance, the specifications of the in-vehicle LAN 70. Furthermore, there is also a case where the pieces of status information $D_1$ to $D_4$ . . . are transmitted from the ECUs at mutually different cycles from one another. In this case, the respective cycles at which the pieces of status information $D_1$ to $D_4$ . . . are sampled in the DPF-ECU 20 could be adjusted so as to correspond to the respective transmission cycles of these pieces of status information. Based on the acquired pieces of status information, the DPF-ECU 20 generates a composite image of the motor vehicle dashboard, etc., for presenting the driver with, for instance, the status of the motor vehicle in an easily comprehensible form. The generated image is sent from the DPF-ECU 20 to the liquid crystal display device 11 and is displayed thereon.

Although, as described above, the "status information" refers to information representing the statuses of the various sections of the motor vehicle, in addition to the information related to the statuses of mechanical operations of the various sections of the motor vehicle (e.g. traveling speed, engine RPM, etc.), it can include information of various types such as information on statuses that are not directly related to the mechanical operations of the various sections (e.g. remaining fuel level, cabin temperature, etc.). Examples of the status information as applied to the case of a passenger vehicle include, without limiting the present invention thereto, the engine RPM, traveling speed, select position, shift position, operational status of the direction indicators, illumination status of the lights, opened/closed status of the doors and trunk, door lock status, status of the tires, presence or absence of air bag malfunctions, fastened/unfastened status of the seat belts, air conditioner air outlet temperature, cabin temperature, ambient atmospheric temperature, status of onboard audio-video equipment, status of the setting of the self-steering function, operational status of the wipers, remaining fuel level, remaining battery capacity, degrees of dependence on the engine and on the battery (in the case of a hybrid vehicle), remaining oil level, radiator temperature, and engine temperature.

The DPF controller 21 is a microcomputer that performs overall control over the operation of the DPF-ECU 20. Furthermore, the DPF controller 21 functions also as an identifier determining portion that compares the status information D with the MEN/SEN judging table 23, and generates, based on the comparison, display identifiers (MEN, SEN) that designate what types of images should be generated, so as to correspond to the status of the motor vehicle at that point in time to send them to the drawing controller 22. The details of the display identifiers (MEN, SEN) generated by the DPF controller 21 will be described later.

Based on the display identifiers provided by the DPF controller 21, the drawing controller 22 refers to the image memory 26 and the command table 25 and generates images to be displayed on the liquid crystal display device 11. Furthermore, the DPF-ECU 20 can also accept moving images such as navigation images as inputted from a storage device (not shown) such as an onboard hard disk provided in the motor vehicle. Thus, the drawing controller 22 can also incorporate a moving image into a composite image as required.

The display control circuit 27 includes various types of circuits that control a display on the liquid crystal display device 11, such as, for instance, a power supply circuit, a graduation voltage generation circuit, circuits for driving various types of drivers in the liquid crystal display device 11, and a backlight control circuit. Among these, the circuits for driving the drivers, etc., may be formed on a liquid crystal panel of the liquid crystal display device 11.

The MEN/SEN judging table 23 is a table used to determine a MEN (main event number) and a SEN (sub-event number) that are display identifiers, based on the status information D obtained from the ECUs 30, 40, 50, 60 . . . via the in-vehicle LAN 70.

The following describes in detail the MEN and the SEN that are display identifiers. The MEN is an identifier that specifies a layout of an image to be displayed on the liquid crystal display device 11. On the other hand, the SEN is an identifier that specifies a display mode of each of individual component images in the layout specified by the MEN. The values of the MEN and the SEN are defined in the MEN/SEN judging table 23 so as to correspond to various values assumed by the status information D. Every time the DFP controller 21 acquires the status information D through the in-vehicle LAN 70, it compares the acquired status information D with the MEN/SEN judging table 23 and determines, based on the comparison, values of the MEN and the SEN that correspond to the status information D, to output them to the drawing controller 22.

Each layout specified by the MEN defines what types of images should be displayed in what portions of a display screen of the liquid crystal display device 11. In the information display system for a motor vehicle of the present preferred embodiment, an appropriate information display corresponding to the current situation of the motor vehicle is realized by defining beforehand mutually different MEN values with respect to various situations determined based on the content of the status information D.

For instance, when the motor vehicle is in a traveling state, the display of a speedometer and a tachometer is required, but when the engine is stopped and the vehicle is parked, the display of those meters is not required, and it is often the navigation images, etc., that are necessary. Therefore, a layout that displays meters such as, for instance, a speedometer and a tachometer is used in the former case, while in the latter case it is desirable to use a layout that does not display meters and reserves large areas for displaying navigation images, etc. Furthermore, for instance, in the case of a motor vehicle provided with cameras on the back or on both sides thereof, which are capable of capturing views outside the vehicle, it is preferable to use a layout that includes areas for displaying images captured by these cameras during back-end or parallel parking. Thus, the information display system for a motor vehicle of the present preferred embodiment provides a driver with necessary information in a clearly visible form by assessing the current status of the motor vehicle based on the status information D and displaying the information on the liquid crystal display device 11 using a layout suitable for the current status of the motor vehicle.

FIGS. 3A and 3B respectively show two specific examples of a layout of images displayed on the liquid crystal display device 11. In the layout shown in FIG. 3A, an area 301 for displaying a car navigation image, an area 302 for displaying an image of a speed meter, an area 303 for displaying an image of a gear indicator, an area 304 for displaying an image of a tachometer, and areas 305 to 307 for displaying images of various types of warning lights are defined. Furthermore, in the layout shown in FIG. 3B, an area 308 for displaying a car navigation image and an area 309 for displaying a video image captured by a camera provided on the back of the motor vehicle are defined. The MENs having mutually different values are assigned to the layouts shown in FIGS. 3A and 3B, respectively. For instance, when the motor vehicle is in a normal traveling state, the layout shown in FIG. 3A is used, while when the vehicle is put into reverse gear, the layout shown in FIG. 3B is used. It is to be noted, however, that each of the layouts shown in FIGS. 3A and 3B is merely one example.

With respect to each layout specified by the MEN as described above, the SEN is defined as an identifier for specifying a display mode of each of component images that are displayed in the areas in the each layout. For instance, FIGS. 4A and 4B show examples of a display on the liquid crystal display device 11 in the case where mutually different SEN values are provided to the above-described layout shown in FIG. 3A. For instance, in FIG. 4A, no image of a warning light is displayed in the area 305 for displaying the image of the warning light. On the other hand, in FIG. 4B, an image is displayed in the area 305, showing that a door warning light is on to warn that any of the doors of the motor vehicle is open. When a plurality of SEN values are defined with respect to a layout specified by one MEN in this manner, various display modes of component images in the layout can be provided.

The following describes in detail one example of a method in which the DPF controller 21 compares the status information D with the MEN/SEN judging table 23 and determines, based on the comparison, values of the MEN and the SEN that correspond to the current status of the motor vehicle. The specific data format described below is an example of a data format in the case of employing CAN (control area network) that has been widely employed, mainly in Europe, as an interface for the in-vehicle LAN 70. However, a standardized interface for an in-vehicle LAN to which a preferred embodiment of the present invention is applicable is not limited to CAN. Arbitrary onboard networks conforming to the standards of various types of interfaces for an in-vehicle LAN such as, for instance, LIN (local interconnect network), MOST (media oriented systems transport), FlexRay, etc. are applicable to preferred embodiments of the present invention.

Referring to FIG. 5, the description is directed first to an example of a format used in the case where the status information D is transmitted on the in-vehicle LAN 70 in accordance with CAN. In the status information D transmitted in accordance with CAN (hereinafter, referred to as "CAN data"), for instance, as shown in FIG. 5, a CAN_ID is included in leading 2 bytes, and the subsequent 1 byte indicates an effective data length in DATA 1 to DATA 8 corresponding to the $4^{th}$ to subsequent bytes. Furthermore, in DATA 1 to DATA 8 corresponding to the $4^{th}$ to subsequent bytes, the CAN data includes variables (CAN variables) representing the statuses of the various sections of the motor vehicle, which have been obtained in the respective ECUs.

Furthermore, it depends on the manufacturer or type of the motor vehicle what types of CAN variables are included in what positions in which CAN_IDs. For instance, in the example shown in FIG. 5, in a piece of the CAN data indicated as CAN_ID=100, 2 bytes of DATA1 to DATA2 represent one CAN variable (CAN_$V_1$). This CAN_$V_1$, in the present embodiment, represents, e.g. the traveling speed. Furthermore, 2 bytes of DATA3 to DATA4 represent one CAN variable (CAN_$V_2$), and this CAN_$V_2$, in the present preferred embodiment, represents, e.g. the engine RPM. Moreover, 4 bytes of DATA5 to DATA8 represent one CAN variable (CAN_$V_3$). This CAN_$V_3$, in the present preferred embodiment, represents, e.g., the travel distance on an odometer. Herein, the number assigned to each CAN variable (value of x in CAN_$V_x$) is used merely for convenience in explaining FIG. 5, and there is no particular meaning in the order indicated thereby. This number x is also not intended to be used for the processing performed by the DPF controller 21.

The CAN variable can have a length of up to 8 bytes but its minimum length is 1 bit. For instance, in a piece of the CAN data indicated as CAN_ID=106, four CAN variables (CAN_$V_{57}$ to CAN_$V_{60}$), each having a length of 1 bit, are included in the least significant bit (Bit0) to Bit3 in 1 byte of DATA3. Similarly, in the piece of the CAN data indicated as CAN_ID=106, eight CAN variables (CAN_$V_{62}$ to CAN_$V_{69}$), each having a length of 1 bit, are included in Bit0 to Bit7 of DATA4. Furthermore, in the same piece of the CAN data indicated as CAN_ID=106, two CAN variables (CAN_$V_{53}$ to CAN_$V_{54}$), each having a length of 1 bit, are included in Bit0 and Bit1 of DATA6, and eight CAN variables (CAN_$V_{72}$ to CAN_$V_{79}$), each having a length of 1 bit, are included in Bit0 to Bit7 of DATA7. Such a CAN variable in the form of 1-bit length data represents binary status information expressed as, e.g. ON/OFF, such as, for instance, the opened/closed status of various types of doors or the operation status of direction indicators. For instance, in the present preferred embodiment, CAN_$V_{72}$ represents the opened/closed status of the right front door, and CAN_$V_{73}$ represents the opened/closed status of the left front door.

As shown in FIG. 5, the respective transmission intervals of pieces of the CAN data are not necessarily uniform. For instance, the transmission interval of the pieces of the CAN data indicated respectively as CAN_IDs=100 to 102 and 107 is 100 msec, while that of a piece of the CAN data indicated as CAN_ID=103 is 300 msec and that of the pieces of the CAN data indicated as CAN_IDs=104 to 106 is 200 msec. Therefore, the DPF controller 21 could sample these pieces of the CAN data as the status information D at cycles corresponding respectively to the transmission intervals of these pieces of the CAN data and perform the after-mentioned processing.

Next, FIG. 6 shows an example of a logical structure of the MEN/SEN judging table 23 used to determine a MEN and SENs based on the above-described CAN data. In the example shown in FIG. 6, the MEN/SEN judging table 23 is composed of a CAN variable conversion table 231, a MEN conversion table 232, and a SEN issuing table 233.

The CAN variable conversion table 231 is a table to which the DPF controller 21 refers in order to extract the above-described CAN variables from the CAN data. This means that, since, as described above, it depends on the manufacturer or type of a motor vehicle what types of CAN variables are included in what positions in which CAN_IDs as the CAN data, it is required that the CAN variable conversion table 231 be prepared for every manufacturer or type of the motor vehicle.

As shown in FIG. 6, the CAN variable conversion table 231 has an area 231*a* for storing the number of CAN variables and an area 231*b* for storing the respective definitions of the CAN variables. FIG. 7 is an explanatory diagram showing an example of data contained in the area 231*b*. As shown in FIG. 7, in the area 231*b*, with respect to each of all the CAN variables included in the CAN data, the CAN_ID of a piece of the CAN data including the each of the CAN variables, its position in the piece of the CAN data, its length, the bit position in the case where the each of the CAN variables is in the form of bitwise data ("Bit" in FIG. 7), a maximum value, a minimum value, and a default value are stored.

In the example of data in the area 231*b* shown in FIG. 7, the "position" in a piece of the CAN data represents an offset position of a CAN variable in question in the unit of byte, where the starting position of DATA1 is defined as 0 in the format of the CAN data shown in FIG. 5. Accordingly, this offset position has a minimum value of 0 and a maximum value of 7. The "length" is stored in the little-endian format in the case of a CAN variable having a length of 2 or more. The "Bit" is used in the case of a CAN variable in the form of 1-bit length data and indicates a bit order number in a bit sequence as the location of the data. That is, in the case where the above-described "position" has a value of k, Bit=0 means that data is present at the rightmost bit (least significant bit) in the byte of DATA(k+1), and Bit=1 means that data is present at the bit in the second digit from the least significant digit in the byte of DATA(k+1). In the case of a CAN variable that is not in the form of 1-bit length data, it is set that Bit=−1.

Furthermore, the minimum value and the maximum value refer respectively to a minimum value and a maximum value of a CAN variable sent from each ECU. These values are used in the DPF-ECU 20 to confirm if the value of a CAN variable falls within a normal range. If a CAN variable sent has a value larger than this maximum value, in the subsequent processing, it is assumed that the CAN variable has the maximum value. Furthermore, if a CAN variable sent has a value smaller than this minimum value, in the subsequent processing, it is assumed that the CAN variable has the minimum value. The default value is used as an initial value of the value from each ECU at the time of startup of the DPF controller 21.

Furthermore, the numerals marked with # in the margin of FIG. 7 indicate the respective numbers of CAN variables (hereinafter, referred to as "CAN variable numbers"). The CAN variable number is used in the after-mentioned processing performed in the DPF controller 21. However, the CAN variable number is not expressly defined in the CAN variable conversion table 231 but is assigned by the DPF controller 21 to CAN variables in the order in which the CAN variables are stored in the area 231*b* of the CAN variable conversion table 231 so that the number increases by 1 from #1.

Thus, according to the example shown in FIG. 7, CAN variable numbers #1 to #4 are assigned respectively to CAN_$V_1$ to CAN_$V_4$ in the CAN variable conversion table 231 illustrated in FIG. 5. Furthermore, CAN variable numbers #72 and #73 are assigned respectively to CAN_$V_{72}$ to CAN_$V_{73}$ in the CAN variable conversion table 231 illustrated in FIG. 5. Although in this description, the number (x) of CAN_$V_x$ defined in the format of the CAN data agrees with the CAN variable number (#j), the order of CAN variables defined in the format of the CAN data does not necessarily have to correspond with the CAN variable numbers determined by the CAN variable conversion table 231.

The description is directed next to the MEN transition table 232. As shown in FIG. 6, the MEN transition table 232 is composed of an area 232*a* for storing the number of layouts defined in this MEN transition table 232, an area 232*c* for storing a transition condition of a transition to each of a plurality of layouts, and an area 232*b* for storing an offset of an area in which each of the layout transition conditions is stored.

Referring to FIGS. 8 and 9, the following describes the MENs and the layout transition conditions. FIG. 8 is a status transition diagram that shows transitions between a plurality of layouts that are used for a display on the liquid crystal display device 11 in the information display system for a motor vehicle of the present preferred embodiment.

A status transition diagram as shown in FIG. 8 is created when designing an information display system for a motor vehicle to determine how the display on the liquid crystal display device 11 is to be transitioned so as to correspond to the status information D (CAN data). In the status transition diagram in FIG. 8, 12 types of layouts exist, which are indicated respectively as MEN=1 to 12.

Each arrow shown in the status transition diagram in FIG. 8 indicates a transition relationship between the layouts, and each condition noted on the each arrow represents a transition condition to be satisfied in order for the transition to occur. The transition condition is expressed as a comparison expression for comparing a CAN variable with a predetermined value. For instance, in order for a transition from the layout of MEN=1 representing "OFF screen" to the layout of MEN=2 representing "ACC screen" to occur, a transition condition that the value of "ignition" as one of the CAN variables is not equal to "OFF" needs to be established.

In the case where every time the DPF controller 21 acquires CAN data through the in-vehicle LAN 70, it determines a layout as a transition target layout, regardless of the layout immediately before the transition, a judgment of a transition condition is always started from the status of "start of transition" shown in FIG. 8. Although there is no layout corresponding to the status of "start of transition," for convenience sake, MEN=0 is assigned to represent the status of "start of transition."

FIG. 9 is an explanatory diagram showing an example of definitions in the area 232*c* of the MEN transition table 232 for realizing the status transitions shown in FIG. 8. In FIG. 9, to facilitate the understanding of the explanation, of the information written in the area 232*c* of the MEN transition table 232, only pieces of information related to status transitions are shown in a conceptually organized form, and thus it is not an actual data structure of the area 232*c* that is shown therein. For instance, CAN variables are expressed not by the above-described CAN variable numbers but by names of the pieces of status information represented by the CAN variables. However, in an actual form of the MEN transition table, the CAN variable numbers (#j) are used that are determined by the CAN variable conversion table 231 as described above.

As shown in FIG. 9, in the area 232*c* of the MEN transition table 232, with respect to each layout, a MEN of a layout as a transition target layout of a transition from the each layout and a transition condition to be satisfied in order for the transition to occur are defined. In the area 232*c* shown in FIG. 9, an area in which a transition condition with respect to a layout of MEN=n (n=an integer of 0 to 12) is stored is indicated as an area 232$c_n$.

For instance, the first item in the area 232$c_0$ defines the following. That is, if a transition condition that in the status of "start of transition" to which MEN=0 is assigned, the value of a CAN variable representing the status of the "ignition" is "OFF" is established, a transition to a layout specified by MEN=1 occurs. In the example shown in FIG. 8, the layout specified by MEN=1 is a layout of "OFF screen."

Furthermore, in the area 232*c* of the MEN transition table 232, it is also possible to express a transition condition from one layout to another in the form of an AND or OR condition related to two or more conditions. For instance, in the example shown in FIG. 8, as a transition condition of a transition from the status of "start of transition" indicated as MEN=0 to a layout of "corner sensor" indicated as MEN=3, both of the following conditions need to be satisfied. That is, a condition that the value of a CAN variable representing the status of the "corner sensor" is "ON" and a condition that the value of a CAN variable representing the status of the "select position" is not "P." In the area 232*c* of the MEN transition table 232, such a transition condition in the form of an AND condition can be defined, for instance, as shown in the area $232c_0$ in FIG. 9. Furthermore, in the example shown in FIG. 8, as a transition condition of a transition from the layout of "corner sensor" indicated as MEN=3 to a layout of "low-speed traveling" indicated as MEN=6, either of the following conditions needs to be satisfied. That is, a condition that the value of a CAN variable representing the status of the "corner sensor" is "OFF" and a condition that the value of a CAN variable representing the status of the "select position" is "P." In the area $232c$ of the MEN transition table 232, such a transition condition in the form of an OR condition can be defined, for instance, as shown in the area $232c3$ in FIG. 9.

Furthermore, as for the areas $232c_1$ to the area $232c_{12}$, as shown in FIG. 6, at the end of each of these areas, a SEN value specifying a display mode of each component image that can be included in a corresponding one of layouts defined by these areas is listed. That is, in each layout specified by one MEN, one or a plurality of component images can be included in various display modes. The SEN is assigned uniquely to each of such mutually different display modes of component images. As will be described later, by the DPF controller 21, the SEN values are determined so as to correspond to the content of the CAN data in accordance with a rule different from the rule for the MEN. In this case, a SEN(s) that can be included in each layout specified by a MEN is defined in a corresponding one of the area $232c_1$ to the area $232c_{12}$, and thus the DPF controller 21 can judge which SEN(s) among the SENs determined based on the CAN data should be outputted to the drawing controller 22. With respect to one MEN, one or a plurality of SENs are determined.

In the area 232b shown in FIG. 6, starting addresses (offsets) of these areas $232c_0$ to $232c_{12}$ are stored, respectively. When a MEN (MEN=n) of a transition target layout is determined, the DPF controller 21 refers to the area 232b to acquire an offset of the area $232c_n$, storing a transition condition(s) with respect to the layout of the said MEN and accesses the said area.

Referring to the flowchart shown in FIG. 10, the following describes a procedure of processing in which upon acquiring CAN data, the DPF controller 21 determines a MEN and a SEN(s).

As shown in FIG. 10, when started up, the DPF controller 21 first initializes MEN_P to 1 (Step S0), and further initializes a value of a variable i to 0 (Step S1). Herein, the MEN_P is a variable for storing a MEN of a previous layout, and in this example, 1 is set as an initial value at Step S0 immediately after the startup. The initial value, however, can be set arbitrarily without being limited to 1. The variable i indicates a transition condition(s) of which MEN the DPF controller 21 refers to. That is, based on the value of i, the DPF controller 21 refers to the area $232c_i$ of the MEN transition table 232 and judges whether or not each transition condition written in this area $232c_i$ is established. Accordingly, every time the DPF controller 21 acquires the CAN data, by performing Step S1, the DPF controller 21 always starts a judgment first from the transition conditions in the area $232c_0$ of the MEN transition table 232.

Next, with respect to a transition condition listed first among the transition conditions written in the area $232c_0$, the DPF controller 21 judges whether or not this transition condition is established (Step S2). If the transition condition is not established (the result of Step S2 is "No"), in the case where the judgment with respect to the transition conditions up to a transition condition listed last in the area $232c_0$ is not yet completed (the result of Step S3 is "No"), the DPF controller 21 sets a transition condition listed next in the area $232c_0$ as a transition condition to be judged (Step S4), and goes back to Step S2 in which the DPF controller 21 repeats the judgment processing. On the other hand, in the case where the judgment with respect to the transition conditions up to the transition condition listed last in the area $232c_0$ is completed without any of the transition conditions being established (the result of Step S3 is "Yes"), by the DPF controller 21, the value of the variable i is set to the value of the MEN_P (Step S5). That is, if none of transition conditions of transitions from the status of "start of transition" is established immediately after the DPF controller 21 is started up, in the present embodiment, the value of i is set to the value set with respect to the MEN_P in Step S0 (namely, 1). Thus, in this case, a candidate for the value of the MEN is determined to be 1, and then Step 7 is performed in which the judgment is restarted, starting from the transition condition written in the area $232c_1$.

Furthermore, if any of the transition conditions written in the area $232c_0$ is established (the result of Step S2 is "Yes"), by the DPF controller 21, the MEN value written as a transition target layout in the case where that transition condition is established is substituted for the variable i (Step S6).

Next, with respect to a transition condition listed first among transition conditions written in the area $232c_i$, the DPF controller 21 judges whether or not this transition condition is established (Step S7). If the transition condition is established (the result of Step S7 is "Yes"), the flow goes back to Step S6, and the processes of Steps S6 and S7 are repeated. If the transition condition is not established (the result of Step S7 is "No") and the judgment with respect to the transition conditions up to a transition condition listed last in the area $232c_i$ is not yet completed (the result of Step S8 is "No"), the DPF controller 21 sets a transition condition listed next in the area $232c_i$ as a transition condition to be judged (Step S9), and goes back to Step S7.

On the other hand, in the case where the judgment with respect to the transition conditions up to the transition condition listed last in the area $232c_i$ is completed without any of the transition conditions being established (the result of Step S8 is "Yes"), by the DPF controller 21, the value of the MEN is set to i (Step S10). Thus, the value of the MEN is determined to be i.

The DPF controller 21 outputs the MEN value determined by the above-described processing to the drawing controller 22 (Step S11). Furthermore, the DPF controller 21 substitutes the determined MEN value for the MEN_P (Step S12). Next, the DPF controller 21 compares the CAN data with the SEN issuing table 233 and determines, based on the comparison, a SEN value(s) to output the SEN value(s) to the drawing controller 22 (Step S13).

After that, when the CAN data is newly acquired through the in-vehicle LAN 70 (the result of Step S14 is "Yes"), the DPF controller 21 goes back to Step S1 and restarts the processes of S1 to S13.

As described above, by the procedure shown in FIG. 10, the DPF controller 21 can determine a MEN and a SEN(s) and output them. For instance, in the case where the driver performs an operation to switch a left direction indicator to an ON state while driving at a speed of 50 km, by this operation, the value of a CAN variable representing the status of the "left direction indicator" in the CAN data becomes "ON." Furthermore, in this case, the value of a CAN variable representing the "speed" in the CAN data is "50." In the case where the DPF controller 21 acquires this CAN data, when the transition conditions in the area $232c_0$ shown in FIG. 9 are judged in descending order, the sixth transition condition from the top in the area $232c_0$ is established, and thus a candidate for the value of a MEN of a transition target layout is determined to be 11. Moreover, when the transition conditions in the area $232c_{11}$, in which transition conditions related to a layout with respect to MEN=11 are written, are judged in descending order, none of the transition conditions in the area $232c_{11}$ is established, and thus the value of the MEN is determined as MEN=11. Consequently, MEN=11 indicating that a layout as a next transition target layout is "Left turn and travel" is outputted to the drawing controller 22.

Referring to FIGS. 11 and 12, the description is directed next to processing in which in Step S13, the DPF controller 21 determines a SEN value(s) and outputs the SEN value(s). FIG. 11 is an explanatory diagram showing one example of a structure of data written in the area 233b of the SEN issuing table 233. The SEN issuing table 233 has an area 233a in which the number of pieces of data (record number) written in an area 233b is written and the area 233b in which SEN values corresponding respectively to values of CAN variables are defined (see FIG. 6). FIG. 12 is a flowchart showing internal processing performed in Step S13 in the flowchart shown in FIG. 10.

As shown in FIG. 11, in the area 233b of the SEN issuing table 233, a CAN variable number, a comparative value, a time (1), a SEN number (1), a time (2), and a SEN number (2) are written. In the column for the CAN variable number, the CAN variable numbers defined in the CAN variable conversion table 231 shown in FIG. 7 are entered. In the case where the value of a CAN variable represented by a CAN variable number is equal to the value of the "comparative value," the values in the column for the SEN number (1) and in the column for the SEN number (2) are determined as SEN values. In the case where the value in the column for the time (1) is 0, only the value of the SEN number (1) is issued. That is, in the case where the value in the column for the time (1) is 0, the value 0 is stored also in each of the column for the time (2) and the column for the SEN number (2). In the case where the value in the column for the time (1) is other than 0, a component image represented by the SEN number (1) is displayed for a period of time designated by the time (1), and a component image represented by the SEN number (2) is displayed for a period of time designated by the time (2). This way of displaying component images is repeated alternately. Thus, for instance, a display of direction indicators or warning lights in a blinking state can be realized. Although FIG. 11 shows the example in which the SEN values are defined with respect to a CAN variable equal to the comparative value, an operator of a CAN variable and the comparative value that is used to determine a SEN value is not limited only to "=" and, for instance, a comparative operator may also be defined.

As shown in FIG. 12, first, the DPF controller 21 compares CAN data with the above-described area 233b of the SEN issuing table 233 and determines, based on the comparison, SEN values corresponding to the CAN data (Step S131). Next, the DPF controller 21 refers to the MEN value (herein, assumed to be k) determined and outputted in Step S11 shown in FIG. 10. The DPF controller 21 then compares the SEN value(s) listed at the end in the area $232c_k$ containing a transition condition(s) related to the layout of this MEN value (k) with the SEN values determined in the above-described Step S131, and determines only a SEN value(s) included in the SEN(s) listed at the end in the area $232c_k$ among the SEN values determined in Step S131 as a SEN(s) to be outputted (Step S132). Then, the DPF controller 21 outputs the SEN value(s) determined in Step S132 to the drawing controller 22 (Step S133).

By the above-described processing, only a SEN(s) of a component image(s) included in a layout specified by the MEN determined and outputted in Step S11 can be outputted to the drawing controller 22.

The MEN and the SEN(s) determined in the above-described manner are sent from the DPF controller 21 to the drawing controller 22. The drawing controller 22 refers to the command table 25, using the MEN and the SEN(s) as indices. Command groups of plural types are pre-registered in the command table 25. These command groups are uniquely associated with values assumed by the MEN and the SEN, respectively. In other words, each command group used to generate a layout image is associated with each value assumed by the MEN. Furthermore, each command group used to generate a component image is associated with each value assumed by the SEN.

The drawing controller 22 reads out command groups corresponding respectively to the MEN and the SEN(s) from the command table 25 and executes them. When the drawing controller 22 executes the command group corresponding to the MEN, a layout image specified by the MEN is generated. Furthermore, when the drawing controller 22 executes the command group(s) corresponding respectively to the SEN(s), component images that correspond in number to the SEN(s) are generated so as to correspond to the SEN value(s) thereof. It should be noted that each of a layout image and component images is generated on a plurality of mutually different layers used to form an overlay image. Subsequently, a composite image as a combined form of the layout image and the component images is generated by superimposing these plurality of layers and is displayed on the liquid crystal display device 11.

The command groups in the command table 25 are created and registered in advance so as to realize displays suited to the statuses of the various sections of the motor vehicle. Examples of these commands include a command to read out data (bitmap data) of each of a layout image and component images from the image memory 26, a command designating the display position and size of a component image, a command to enlarge or shrink a component image, a command designating the angle of rotation of a component image, and a command to transfer images to the respective layers of an overlay image.

As described above, according to the information display system for a motor vehicle of the present preferred embodiment, a composite image corresponding to the statuses of the various sections of the motor vehicle can be generated and displayed on the liquid crystal display device 11. Furthermore, according to the information display system for a motor vehicle of the present preferred embodiment, the problem of the difference in format of the status information D depending on the manufacturer or type of a motor vehicle can be overcome simply by suitably changing the contents of the MEN/SEN judging table 23. That is, the processing program performed by the DPF controller 21 (e.g. the procedure in the flowchart shown in FIG. 10) can be commonly used regardless of the manufacturer or type of a motor vehicle. This can achieve a reduction in the development cost of information display systems for motor vehicles.

The above-described preferred embodiment does not limit the technical scope of the present invention thereto, and various changes can be made within the scope of the invention. For instance, in the above-described specific example, the screen displayed on the liquid crystal display device 11 was preferably formed of a combination of a layout specified by one MEN and a component image(s) specified by one or a plurality of SENs. However, for instance, in the case where the screen of the liquid crystal display device 11 is displayed in such a manner as to be divided into a plurality of portions, and in the case where mutually different images are displayed according to a plurality of viewing angles of the liquid crystal display device 11, it is also possible to use a plurality of layouts. Accordingly, in such a case, a plurality of MENs are determined. Furthermore, the above-described preferred embodiment was preferably directed to the example in which one or a plurality of SENs were determined with respect to one MEN. However, there is also a case in which one or a plurality of SENs are composited with one SEN.

Furthermore, the above-described preferred embodiment was directed to the example in which two types of display identifiers, i.e. the MEN and the SEN were used. However, the number and type of display identifiers are not limited only to this specific example. Furthermore, the specific examples of identifier tables used to determine display identifiers were shown in FIGS. 6, 7, 9, 11, etc. However, these specific examples are merely illustrative, and identifier tables of various configurations may be used.

Moreover, the above-described preferred embodiment used a liquid crystal display device. However, the scope of the present invention is not limited to information display systems using liquid crystal display devices. An arbitrary display device can be used as long as at least the portion thereof that is used to display a composite image corresponding to status information is a dot-matrix type display device.

In addition, the scope of the present invention is not limited only to information display systems incorporated into instrument panels, such as the one described above. For instance, an information display system using a display device of the type that displays or projects images on a window in front of the driver's seat in a vehicle, etc. or a display device of the type worn on the body of the driver may also be possible.

The information display system for a mobile unit according to preferred embodiments of the present invention can display not only the status of a mobile unit such as a vehicle alone, but also such information in combination with other arbitrary images (still images or moving images) such as, for instance, video images capturing scenery outside a vehicle, video images stored in a storage medium provided in a vehicle, etc., video images obtained via external communications, as well as additional information such as character information, etc.

The present invention can be utilized as an image information generation device that is capable of easily generating, based on status information representing the statuses of various sections of a mobile unit such as a motor vehicle, image information used to display an image required, for instance, for steering this mobile unit, a display control apparatus including the same, an information display system for a mobile unit, a cockpit module, and a mobile unit.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. An image information generation device that generates, based on status information collected from various sections of a mobile unit, image information used to display an image corresponding to a status of the mobile unit on a dot-matrix type display device, the image information including a layout identifier that specifies a layout of an image to be displayed on the display device and a component image identifier that specifies a display mode of each component image in the layout, the image information generation device comprising:

an identifier storing portion arranged to store an identifier table in which a correlation between the status information and the layout identifier, a correlation between the status information and the component image identifier, and a correlation between the layout identifier and the component image identifier are defined; and an identifier determining portion arranged to acquire status information collected from the various sections of the mobile unit, compare the acquired status information with the identifier table, determine, based on the comparison, one of the layout identifiers and a group of component image identifiers among the component image identifiers that correspond to a status of the mobile unit at a time when the status information was collected, and output the one of the layout identifiers and the group of component image identifiers.

2. The image information generation device according to claim 1, wherein the identifier table defines, as the correlation between the status information and the layout identifier, a transition relationship between a plurality of layouts and a transition condition that needs to be satisfied by the status information in order for a transition between the plurality of layouts to occur, and every time the identifier determining portion acquires status information collected from the various sections of the mobile unit, the identifier determining portion compares the acquired status information with the transition condition in the identifier table, determines, based on the comparison, one of the layout identifiers corresponding to a layout as a transition target layout, and outputs the one of the layout identifiers.

3. The image information generation device according to claim 2, wherein in the identifier table, the transition condition is defined using a comparison expression to compare a variable included in the status information with a predetermined value, and the identifier table includes a variable conversion table to extract the variable from the status information.

4. The image information generation device according to claim 1, wherein the identifier table defines, as the correlation between the layout identifier and the component image identifier, a display mode of a component image that can be included in each layout, every time the identifier determining portion acquires status information collected from the various sections of the mobile unit, the identifier determining portion compares the acquired status information with the identifier table, and determines, based on the comparison, one of the layout identifiers and a group of component image identifiers among the component image identifiers, and in the determination, at least one of the group of component image identifiers that is correlated with the determined one of the layout identifiers according to the correlation between the layout identifier and the component image identifier is determined to be outputted.

5. A display control apparatus, comprising:

an image information generation device as claimed in claim 1;

an image storing portion arranged to store layout images corresponding respectively to the layout identifiers and component images corresponding respectively to the component image identifiers; and an image synthesizing portion arranged to acquire one of the layout identifiers and at least one of the component image identifiers that are outputted from the identifier determining portion of the image information generation device, extract one of the layout images corresponding to the one of the layout identifiers and at least one of the component images corresponding to the at least one of the component image identifiers from the image storing portion, and synthesize the one of the layout images and the at least one of the component images to generate an image to be displayed on the display device.

6. An information display system for a mobile unit, comprising:
   a display control apparatus as claimed in claim 5; and
   a display device arranged to display an image generated by the image synthesizing portion of the display control apparatus.

7. The information display system for a mobile unit according to claim 6, wherein the display device is a liquid crystal display device.

8. A cockpit module that is installed in a vicinity of a cockpit of a mobile unit, comprising an information display system for a mobile unit as claimed in claim 6.

9. A mobile unit, comprising an information display system for a mobile unit as claimed in claim 6, wherein the display device is installed at a position viewable at least from a cockpit.

10. The mobile unit according to claim 9, wherein the mobile unit is a motor vehicle, and the status information is transmitted from ECUs provided in various sections of the motor vehicle and is collected into the image information generation device via an in-vehicle network.

* * * * *